US010327486B2

(12) United States Patent
Saberzadeh (10) Patent No.: US 10,327,486 B2
(45) Date of Patent: Jun. 25, 2019

(54) THREE-DIMENSIONAL APPLIQUE EFFECT (71) Applicant: Roya Saberzadeh, Northridge, CA (US)

(72) Inventor: Roya Saberzadeh, Northridge, CA (US)

(*) Notice: Subject to any disclaimer, the term of this patent is extended or adjusted under 35 U.S.C. 154(b) by 542 days.

(21) Appl. No.: 14/624,509

(22) Filed: Feb. 17, 2015

(65) Prior Publication Data

US 2016/0235144 A1 Aug. 18, 2016

(51) Int. Cl.
A41D 27/08 (2006.01)
B32B 5/24 (2006.01)

(52) U.S. Cl.
CPC .............. A41D 27/08 (2013.01); B32B 5/245 (2013.01); B32B 2250/04 (2013.01)

(58) Field of Classification Search
CPC . B32B 5/245; B32B 2250/03; B32B 2250/04; D03D 25/005; A41D 27/08
USPC .......................... 112/475.09, 475.18; 156/93
See application file for complete search history.

(56) References Cited

U.S. PATENT DOCUMENTS

| 3,608,092 | A | | 9/1971 | Taranto | |
|---|---|---|---|---|---|
| 3,619,336 | A | * | 11/1971 | Hughes | D04H 1/52 28/153 |
| 3,629,034 | A | * | 12/1971 | Kuroda | B29C 65/02 156/209 |
| 4,591,521 | A | * | 5/1986 | Freno | B44F 7/00 2/80 |
| 4,815,149 | A | | 3/1989 | Erhardt | |
| 4,837,864 | A | | 6/1989 | Thill | |
| 5,007,113 | A | | 4/1991 | Bouadjadja | |
| 5,184,362 | A | | 2/1993 | Yager et al. | |
| 5,251,337 | A | | 10/1993 | Sloot | |
| 5,636,385 | A | | 6/1997 | Harrison | |
| 5,747,144 | A | | 5/1998 | Beige et al. | |
| 5,974,997 | A | | 11/1999 | Amburgey | |
| 5,989,678 | A | * | 11/1999 | Jacobson | A41D 27/08 428/100 |
| 6,067,660 | A | | 5/2000 | Contini | |
| 6,139,928 | A | | 10/2000 | Sloot | |
| 6,322,866 | B1 | | 11/2001 | Sloot | |
| 6,718,895 | B1 | * | 4/2004 | Fortuna | D05B 19/08 112/475.19 |
| 8,719,962 | B1 | | 5/2014 | Huff | |

(Continued)

Primary Examiner — Scott W Dodds
(74) Attorney, Agent, or Firm — Ferguson Case Orr Paterson LLP (57) ABSTRACT Methods according to the present disclosure include creating a three-dimensional effect, for example, an applique effect, that allows for the effect to be more integrated with the object to which it is added than in conventional methods. These methods can include adding the effect or applique on a surface of an object with the object sandwiched between the applique and a structure-imparting material, allowing the applique and the object it is on to move more freely and in unison together. In some embodiments, the structure-imparting material is sandwiched between the applique and/or the object on one side and a support backing on the opposite side. The three-dimensional applique can be formed by applying force to the object on a side opposite to the applique such that indentations and protrusions are formed in the layered structure of the object and structure-imparting material, providing a three dimensional applique image.

10 Claims, 5 Drawing Sheets (56) References Cited

U.S. PATENT DOCUMENTS

| | | | | |
|---|---|---|---|---|
| 2006/0198990 A1* | 9/2006 | Ku | ............... | B32B 5/022 |
| | | | | 428/158 |
| 2007/0162176 A1* | 7/2007 | Peyser | ............... | A41D 27/08 |
| | | | | 700/138 |
| 2013/0263769 A1* | 10/2013 | Tempestra | ............... | D05C 9/04 |
| | | | | 112/475.18 |
| 2015/0296897 A1* | 10/2015 | de Luca Neto | ............... | A41D 1/00 |
| | | | | 428/172 |

\* cited by examiner

THREE-DIMENSIONAL APPLIQUE EFFECT

BACKGROUND OF THE INVENTION

Field of the Invention

The present invention relates generally to three-dimensional effects to be applied to garments and other physical items, for example, applique producing a three-dimensional effect.

Description of the Related Art

The fashion industry and various other design industries, such as those relating to apparel and interior decorating and furnishings, are constantly searching for new and inventive expressions and designs. One such desirable design includes the production of images and lettering that exhibit a three-dimensional effect to appeal to one or more of a viewer's senses, for example, appearing to be three-dimensional to the eye or feeling three-dimensional to the touch. One industry where such three-dimensional is in particular demand is in the industry of university-themed apparel, for example, sweaters, hats and graduation sashes with the university's name stenciled in apparently three-dimensional lettering, allowing an individual's college affiliation to prominently stand out with pride.

Conventionally, a three-dimensional applique effect is typically achieved through the use of applying a three-dimensional image or portion of lettering directly to one side of the garment or item on which the user wants to display the three-dimensional image. An example of this is shown in U.S. Pat. No. 3,608,092 to Taranto, which sets forth a three-dimensional appearing applique bib design for an infant's garment. As is shown in the Taranto patent, such three-dimensional applique effects typically comprise a material imparting the general design and shape of the applique and a material imparting the volume or three-dimensional features to the applique. The applique, comprising a three-dimensional image, is then simply affixed to one side of the garment in its complete form.

One negative issue that arises when utilizing conventional three-dimensional applique effects, such as those set forth above, is that the three-dimensional image or lettering does not move consistently with the garment that it is affixed to. Since the three-dimensional image is formed separately from the garment and affixed to one side of the garment, the three-dimensional image moves independently from the garment or even appears stationary, causing the garment to "bunch-up" in areas adjacent to the site where the three-dimensional image is affixed. This can result in undesirable visual sensations as well as discomfort for the wearer. This is especially true when certain garment materials are used, for example silk or satin graduation sashes can have their movement and flexibility substantially hindered when a university's school name has been applied to them as a three-dimensional applique effect using conventional methods.

Thus, improved applique and methods or applying them that allow for increased and/or consistent movability in an associated garment to which the applique is applied are therefore needed.

SUMMARY OF THE INVENTION

Described herein are methods of creating a three-dimensional effect, for example, by adding an applique to a pre-existing object, such as an article of clothing. Methods incorporating features of the present invention comprise adding a three-dimensional applique or otherwise forming a three-dimensional effect on one side of the object with a structure-imparting material on the opposite side. Indentions and protrusions can be formed on the side of the object to which the three-dimensional effect has been added, causing the object and the structure-imparting material to interact, creating the three-dimensional effect. This three-dimensional effect has the advantage of being more integrated with the object and moving, for example stretching, as a singular unit and thus is advantageous of conventional three-dimensional applique effects wherein a prior-art three-dimensional applique is simply added to one side of an object.

In one embodiment incorporating features of the present invention, a method of creating a three-dimensional applique effect comprises the steps of providing an object and designating at least a portion of a side of the object as an area to add an applique, placing a structure-imparting material on the opposite side of the object as the designated area, and applying force to the designated area, such that the object and the structure-imparting material form at least one permanent protrusion.

In another embodiment incorporating features of the present invention, a method of creating a three-dimensional applique effect comprises the steps of providing an object having at least a first side and a second side, placing an applique on at least a portion of the first side of the object, placing a structure-imparting material on the second side of the object opposite the applique, and applying force to the applique to form one or more indentations, with the indentations defining one or more three-dimensional protrusions.

In still another embodiment incorporating features of the present invention, a method of creating a three-dimensional applique effect, comprising the steps of providing an object, placing an applique on at least a portion of a first side of the object, placing a structure-imparting material and a support backing on a second side of the object opposite the applique such that the object is sandwiched between the applique and the structure-imparting material, and confining the structure-imparting material between the support backing and the applique such that the applique, object and structure-imparting material form at least one permanent protrusion.

These and other further features and advantages of the invention would be apparent to those skilled in the art from the following detailed description, taken together with the accompanying drawings, in which:

DETAILED DESCRIPTION OF THE INVENTION

Embodiments incorporating features of the present invention include creating a three-dimensional effect that allows for the effect to be more integrated with the object to which it is added than in conventional methods. These methods can include forming a three-dimensional effect on a surface of an object and/or attaching an applique to the surface of the object such that the object is sandwiched between the effect and/or applique and a structure-imparting material, allowing the three-dimensional effect or applique and the object it is on to move more freely together as one unit. Methods incorporating features of the present invention comprise adding an applique and/or forming a three dimensional effect on a first side of the object with a structure-imparting material on the opposite side. Indentions and protrusions can be formed on the first side of the object where the effect and/or applique has been added, causing the object and the structure-imparting material to interact, creating a three-dimensional sensation. In some embodiments, support structures are used to further secure the indentions and protrusions in place. In some embodiments, shape-defining structures are also included to separate the protrusions and/or indentations from other portions of the object.

In some embodiments, a support backing is used to confine the structure-imparting material and the object to which the three-dimensional effect and/or applique is being applied between the support backing and the effect and/or applique. The structure-imparting material can expand and/or fill out the confined space between the support backing and the applique, further adding to the three-dimensional appearance of the applique.

Throughout this description, the preferred embodiment and examples illustrated should be considered as exemplars, rather than as limitations on the present invention. As used herein, the term "invention," "device," "method," "present invention," "present device" or "present method" refers to any one of the embodiments of the invention described herein, and any equivalents. Furthermore, reference to various feature(s) of the "invention," "device," "method," "present invention," "present device" or "present method" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

Figure 1:
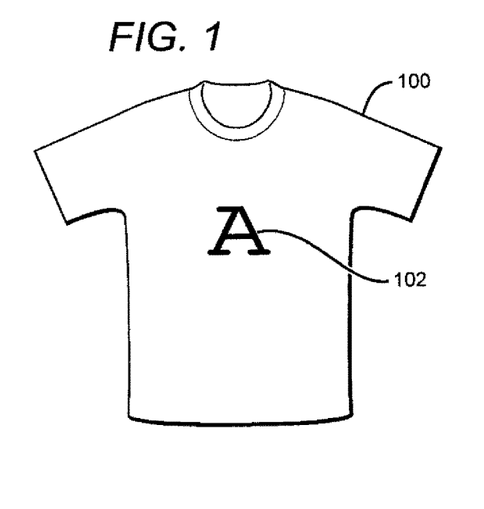
FIG. 1 is a top view of an article of clothing incorporating an embodiment of a three-dimensional applique incorporating features of the present invention.

FIG. 1 shows an example of an article of clothing 100 to which an applique 102 has been attached. While FIG. 1 shows the article of clothing 100 as being a common t-shirt, it is understood that three-dimensional applique and their methods of application incorporating features of the present invention can be utilized with any article of clothing or other physical item to which a user desires to attach an applique, for example, to alter the aesthetic appearance of the item. Such articles to which a user can attach applique include, but are not limited to: clothing (for example, shirts, jackets, blouses, dresses, pants, hats, costumes, graduation sashes and other ceremonial apparel), paintings, such as canvas painting, wallpaper, curtains, blankets, pillows, furniture and decorative and living-space furnishing items.

The applique 102 itself can be an item of any shape and physical configuration, which can affect the appearance of the physical article to which it is attached, for example, any image, symbol or letter. In the embodiment shown, the applique 102 is a stylized version of the letter "A." The applique 102 can be a separate article from the article of clothing 100, for example, a patch, decal, or another article of clothing that is either pre-processed into a desired shape and/or configuration prior to being attached to the article of clothing 100 or that is processed during or after the attachment to the article of clothing 100. In some embodiments, the applique 102 comprises thread, yarn or other embroidery materials that are stitched directly into the article of clothing 100. In some embodiments, a separate applique 102 is not used, but instead the article of clothing 100 itself is shaped into the applique 102, for example, by altering a desired portion of the article of clothing's shape, such as by pressing, embossing of stitching the article of clothing 100.

Both the article of clothing 100 (or another non-clothing physical article as noted above) and the applique 102 can comprise any suitable material that allows for the intended function of the articles 100, 102, for example, suitable for human clothing when the article of clothing 100 is a t-shirt. Some examples of materials that the article of clothing 100 and/or the applique can comprise include, but are not limited to: various textiles, leather, fleece, satin, poly-satin, rayon, silk, polyester, nylon, wool, lace, twill, cotton and combinations thereof. The article of clothing 100 and the applique 102 can comprise the same materials or can comprise different materials.

Figure 2:
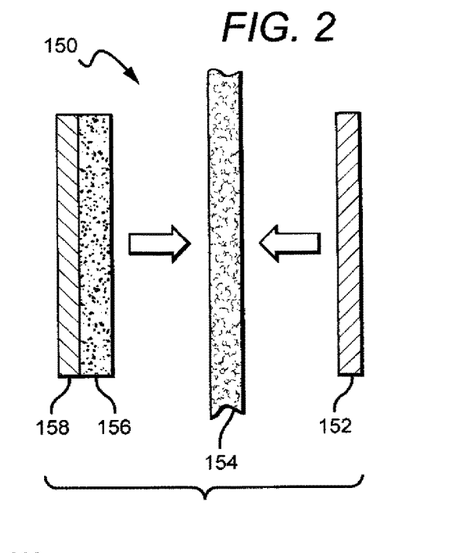
FIG. 2 is a sectional view of an embodiment of a method of applying a three-dimensional applique incorporating features of the present invention.

FIG. 2 illustrates a method 150 of attaching an applique 152, similar to the applique 102 in FIG. 1 above, to an existing article of clothing 154. The applique 152 is positioned on the side of the article of clothing on which the applique 152 is to be attached for display, for example, the front of a t-shirt as shown. On the opposite side of the article of clothing 154 on which the applique 152 is to be displayed, for example, on the inner portion of the front of the t-shirt in the example of FIG. 2, a structure-imparting material 156 and an optional support backing 158 are positioned, thus sandwiching the front portion of the article of clothing 154 in between the applique 152 and the structure-imparting material 154.

The terms "sandwich" or "sandwiching," as used in the present disclosure refer to an object, such as a layer of material, being positioned between two other objects. For example, if an article of clothing is sandwiched between an applique and a structure-imparting material, the article of clothing is between those two features. It is understood that the term "sandwich" or "sandwiching" can refer to the sandwiched article being between two objects with other intervening objects also being sandwiched between the two objects. For example, according to the positioning indicated in FIG. 2, the structure-imparting material is still considered "sandwiched" between the applique 152 and the support backing 158, even though the intervening article of clothing 154 would also be considered sandwiched between the applique 152 and the support backing 158. Conversely, if the present disclosure refers to an object being "directly sandwiched" between two other objects, this indicates that no intervening objects are present.

The structure-imparting material 156 can be any material that has physical properties configured to impart firmness or structure to provide the applique 152 with the desired three-dimensional shape. Typically, the structure-imparting material 156 comprises a flexible foam-like or "puffy" texture and/or a material that can be compressed and can expand to fill in a confined space. While any material that is capable of providing the three-dimensional look and feel to the applique 152 can be used with embodiments according to the present disclosure, some preferable materials that the structure-imparting material 156 can comprise include: an at least partially non-fabric material, sponge or sponge-like material, foam-like material (such as polystyrene foam), polyester-based materials, polyester fiberfill and various fabric and foam multilayered composite materials. In some embodiments wherein a less prominent three-dimensional effect is desired, 100% polyester fiberfill can be used. In some embodiments wherein a more prominent three-dimensional effect is desired, a fabric and foam multilayered composite material can be used. In some embodiments, the structure-imparting material 156 can comprise a material that is pliable and flexible, providing the advantage that such a material further enhances comfort and/or movability of a user of the article of clothing 154 or a corresponding physical object to which the applique 152 has been connected. In some embodiments, the structure-imparting material can comprise air or another gas configured to fill a space to provide a three-dimensional structure to the applique 152.

The support backing 158 is an optional structure that can improve the stability and degree of the three-dimensional applique effect. The support backing 158, essentially "locks" the structure-imparting material 156 in place such that the article of clothing 154 is sandwiched between the applique 152 and the support backing 158. Due to the physical characteristics of the structure-imparting material 158, for example, the ability to compress and expand and/or the material's firmness, the structure-imparting material can be configured to push against the article of clothing 154 and the applique 152 in one direction and push against the support backing 158 in the opposite direction, thus imparting a three-dimensional "popping-out" look and feel to the applique 152.

A similar effect can be obtained without the use of the support backing 158, for example, by utilizing firm stitching or pressing methods to position the structure-imparting material 156, such that it presses against the article of clothing 154 and the applique 152. In embodiments where the article of clothing 154 itself functions as the applique, for example, when a portion of the article of clothing 154 is stitched into the structure-imparting material 156 and there is not a separate applique 152, the support backing 158 can also provide an additional structure that the structure-imparting material 156 can press against to help create the three-dimensional effect, as there is no separate applique 152 to press against.

Figure 3:
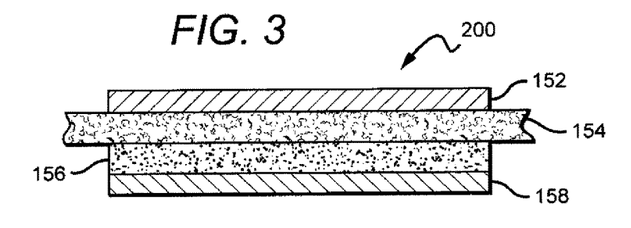
FIG. 3 is a sectional view of an article of clothing incorporating an embodiment of a three-dimensional applique incorporating features of the present invention.

FIG. 3 shows a sectional view of an applique configuration 200, obtained through the positioning of the various features through use of the method 150 of FIG. 2 described herein, for example, by sandwiching an article of clothing in between an applique and a structure-imparting material. Like was shown in the method of FIG. 2, the applique configuration 200 of FIG. 3 comprises an applique 152, an article of clothing 154, a structure-imparting material 156 and a support backing 158, wherein like reference numbers have been utilized to denote like features. This positional applique configuration 200 shown in FIG. 3 will be utilized to further describe methods incorporating features of the present invention.

An advantage of the applique configuration 200 of FIG. 3 is that the article of clothing 154 and the applique 152 are more integrated and can move together more fluidly than in conventional three-dimensional applique configurations wherein the applique and the structure-imparting material are grouped together and attached to one side of the article of clothing. In some embodiments of methods incorporating features of the present invention, the article of clothing 154 is sandwiched between the structure-imparting material 156 and the applique 152. Thus the applique 152, article of clothing 154, the structure-imparting material 156 can move as a single unit, providing a more comfortable wearing experience and mitigating non-ascetically-pleasing "bunching" of the clothing and the applique caused by them moving independently of one another.

Figures 4A, 4B:
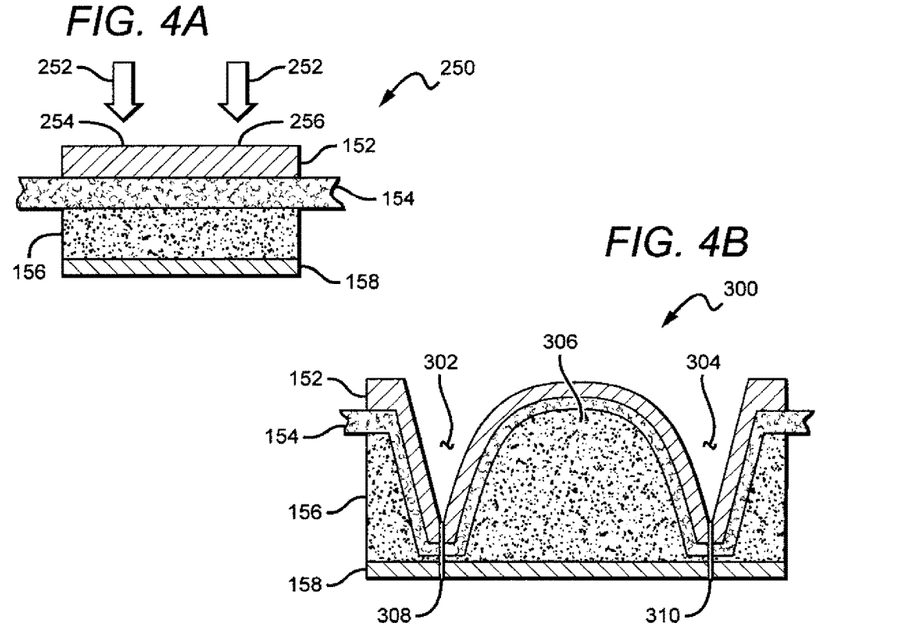
FIG. 4A is a sectional schematic view of a first embodiment of a method of applying a three-dimensional applique incorporating features of the present invention.
FIG. 4B is a further sectional schematic view of the embodiment of FIG. 4A.

FIGS. 4A and 4B show an embodiment of a method of applying a three-dimensional applique effect utilizing the applique configuration 200 set forth with regard to FIG. 3. FIG. 4A shows an applique configuration 250, similar to the applique configuration 200 of FIG. 3, in that it comprises an applique 152, an article of clothing 154, a structure-imparting material 156 and a support backing 158, wherein like reference numbers have been utilized to denote like features. As is shown in FIG. 4A, the applique can be applied to the garment by applying force 252 at select locations 254, 256 of the applique configuration 250. These locations 254, 256 correspond to the desired applique shape, design and configuration being applied to the article of clothing 154. For example, if the applique 152 is a stylized version of a letter, such as shown in FIG. 1, the force 252 can be applied to the outer perimeter of the letter, pushing these portions of the applique 152 downward in relation to the garment 154 and structure-imparting material 156, causing the inner portions of the applique 152, for example, the non-perimeter portions of a stylized letter, to have a three-dimensional appearance.

The resulting applique configuration 300 of the application of force to the applique configuration 250 of FIG. 4A is shown in more detail in FIG. 4B, which shows the resulting applique configuration 300 comprising the applique 152, article of clothing 154, structure-imparting material 156 and support backing 158 of the original applique configuration 250, albeit now in a modified configuration 300. The applique configuration 300 in FIG. 4B shows that the application of force mentioned herein with regard to FIG. 4A causes one or more areas of indentation 302, 304 (two shown), forming one or more protrusions 306 (one shown) corresponding to the desired shape of the applique 152 defined by the application of the force, for example, if the force was applied to the perimeter of a stylized version of the letter "A," thus creating indentations corresponding to the perimeter of the letter, this would cause the formation of a protrusion corresponding to the inner shape of the letter, causing the letter to exhibit a three-dimensional appearance.

In some embodiments, the applique 152 is pre-configured to correspond to a desired shape or image, for example, it can be pre-stenciled to be a layer of material with a stylized letter "A" outlined on it. Force can be applied to the stenciled "A," tracing, and thus indenting, the perimeter of the letter and creating a protruding effect for the letter. In other embodiments, the applique material 152 is not pre-configured, allowing a user to create the protrusions and indentations to create a free-form three-dimensional shape or image.

Force can be applied to the applique configuration 300 in a variety of ways. In some embodiments, the force is applied (and indentations created) through embroidery techniques such as sewing and/or stitching, either manually or via machine. In some embodiments, the force is applied (and indentations created) by use of pressing, stamping and/or embossing, either manually or with a machine. In some embodiments, the force applied can be a temperature, for example, high heat or cold, or can be a laser. In some embodiments, the application of force includes a cutting away of a portion of materials. In the pressing, stamping and embossing embodiments, a press device can be configured to comprise the shape of a desired image, which can be pressed into the applique 152, article of clothing 154 and the structure-imparting material 156 to create the desired three-dimensional applique image. In addition to these specially described methods of applying force, and method of applying force known in the field of fabrics, clothing or textiles can be used to create indentations and corresponding protrusions.

With certain materials that tend to hold the same shape after the indentations 302, 304 and protrusions 306 are formed, the simple application of force can be enough to create the desired three-dimensional applique effect and attach it to an article of clothing 154. However, with some materials, or if more stability is desired, one or more securing elements 308, 310 (two shown) can be used. The securing elements 308, 310 can be applied to the various layers of the applique configuration 300 during or after the formation of the indentations 302, 304 and are configured to hold the shape of the indentations 302, 304 and/or protrusions 306 in place to maintain the three-dimensional applique effect.

The securing elements 308, 310 can secure the indentations 302, 304 and/or protrusions 306 in place by attaching the indented portions of the layers of the applique configuration 300 to one or more other portions or layers of the applique configuration 300, for example, by attaching the applique 152 to the support backing 158. In some embodiments, the physical structure of the securing elements 308, 310 themselves can hold the indentations in place, for example, by comprising a certain shape or comprising a certain material, mass or weight that can hold the indentations 302, 304 and/or protrusions 306 in place. In the embodiments shown, the securing elements 308, 310 attach indented portions of the layers of the applique configuration 300 to the support backing 158.

Various methods and structures can be used as securing structures 308, 310. For example, like with the application of force above, embroidery techniques such as sewing and/or stitching, either manually or via machine, can be utilized to secure indented portions of the layers of the applique configuration 300, for example, stitching the layers in an indented configuration to the support backing 158, thus applying force through the sewing process and forming the indentations, while simultaneously attaching the indented portions in place.

Again, like with the application of force, pressing, embossing and/or stamping can be used to press or fuse an indented portion of the layers of the applique configuration 300, while simultaneously applying force and creating the indentations 302, 304. The force or pressure of the press can fuse the indented portions to the support backing 158 or another structure to secure the shape of the indentations 302, 304 and the protrusions and/or heat/steam/chemical/temperature pressing can be utilized to hold the indentations 302, 304 and protrusions 306 in place.

Other potential securing elements 308, 310 include any attachment elements capable of securing materials such as fabrics and textiles, for example, securing structures such as pins, adhesives and chemical treatments. A user can manually utilize one or more of these securing structures to secure an indentation 302, 304 or protrusion 306 after the application of force to form an indentation 308, 310 or utilize a machine to apply the securing structure after or during the application of force.

FIG. 4B also demonstrates one way that the structure-imparting material 156 can create the three-dimensional applique effect. As seen in the indentation 306, the structure-imparting material 156 can have a physical property of being firm or being able to expand when compressed by the formation of the indentations 302, 304. This causes the structure-imparting material 156 to become confined or trapped in a certain location and to press against adjacent layers. In the embodiment shown, the structure-imparting material 156 is confined in the indentation portion 306 of the applique configuration 300 and expands, pressing against the support backing 158 and the top layers of the applique 152 and the article of clothing 154, causing the applique 152 to present itself with a three-dimensional "popping out" appearance.

An advantage of having the article of clothing 154 sandwiched between the applique 152 and the structure-imparting material 156, or otherwise being part of a singular protrusion structure 306, is that the article of clothing 154, the structure-imparting material 156 and the applique 152 can all move and operate as a singular unit and the unsightly bunching and wrinkling of the article of clothing 154 and any damage to more rigid structures on the clothing are mitigated. Furthermore, as the applique 152 can more freely move together with the clothing article 154, wearer comfort is increased. This is advantageous over conventional three-dimensional effects, where the applique and any structure-imparting material is simply grouped together on one side or an article of clothing and is not as integrated.

Figures 5A, 5B:
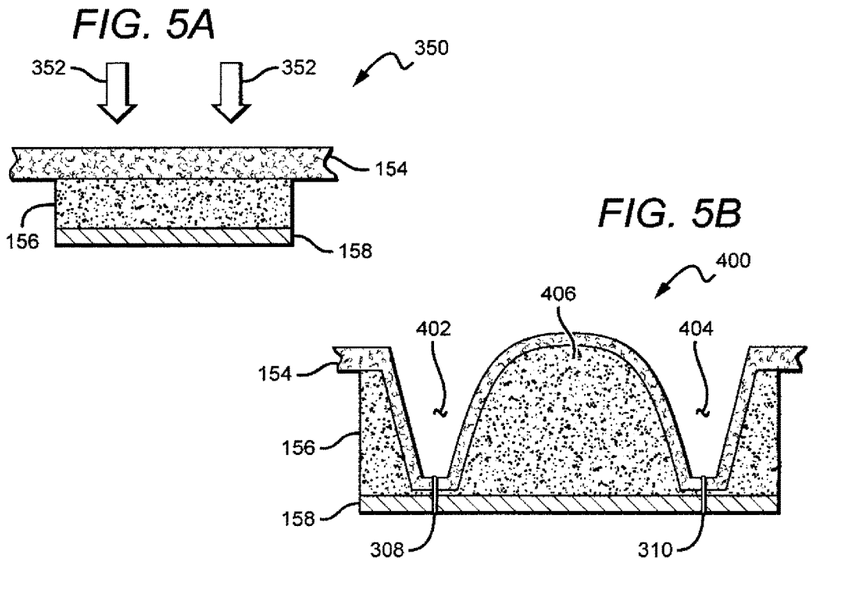
FIG. 5A is a sectional schematic view of an embodiment of a method of applying a three-dimensional effect incorporating features of the present invention.
FIG. 5B is a further sectional schematic view of the embodiment of FIG. 5A.

While it is apparent that use of a separate applique 152 can be advantageous, it is not strictly necessary, as the article of clothing 154 itself can be shaped to produce a three-dimensional structure. FIGS. 5A and 5B show an embodiment of a method of applying a three-dimensional effect utilizing a different three-dimensional effect configuration 350. FIG. 5A shows a three-dimensional effect configuration 350, similar to the applique configuration 250 of FIG. 4A, in that it comprises an article of clothing 154, a structure-imparting material 156 and a support backing 158, wherein like reference numbers have been utilized to denote like features.

Unlike the configuration 250 in FIG. 4A, the configuration 350 in FIG. 5A does not comprise a separate applique. Instead, force 352 is applied as described above, but applied directly to the article of clothing 154 (or other object to which the three-dimensional effect is to be applied), which alters its shape, producing the three-dimensional effect through the article of clothing's 154 interaction with the structure-imparting material 156 and the support backing 158 in a manner similar to the applique embodiments discussed above.

The resulting three-dimensional effect configuration 400 of the application of force to the three-dimensional effect configuration 350 of FIG. 5A is shown in more detail in FIG. 5B, which shows the resulting configuration 400 comprising the article of clothing 154, structure-imparting material 156 and support backing 158 of the original configuration 350, albeit now in a modified configuration 400. The configuration 400 in FIG. 5B shows that the application of force mentioned herein with regard to FIG. 5A causes one or more areas of indentation 402, 404 (two shown), forming one or more protrusions 406 (one shown) corresponding to the desired shape of the article of clothing 154 defined by the application of the force. Securing structures 308, 310 can be utilized to secure the indented portions of the configuration 400 to the support backing 158. This configuration allows the article of clothing 154 itself to function similar to the separate applique from the other embodiments described herein and to move with the structure-imparting material 156 as a singular unit.

Figures 6A, 6B:
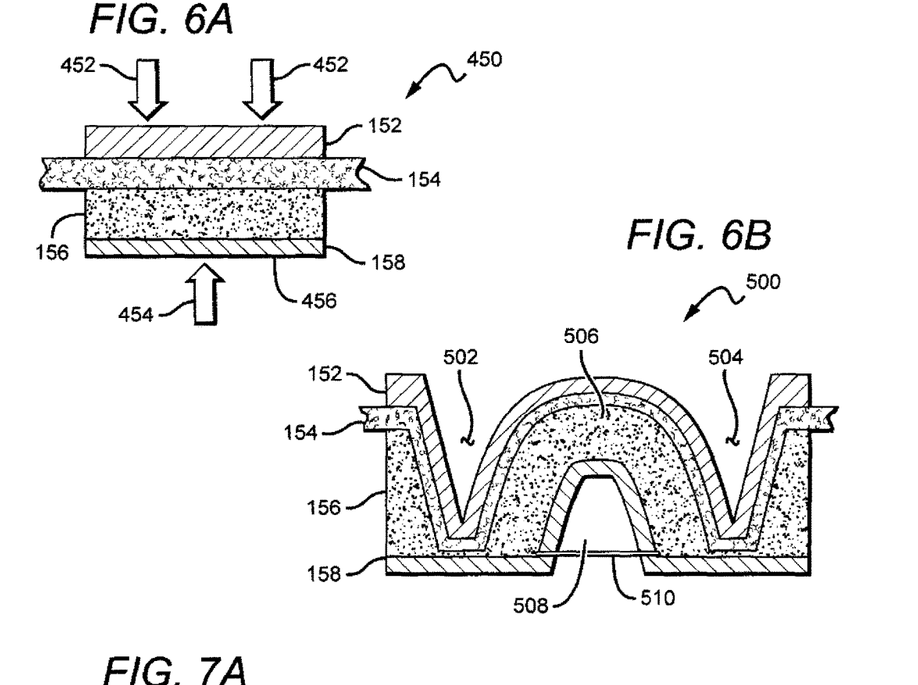
FIG. 6A is a sectional schematic view of a third embodiment of a method of applying a three-dimensional applique incorporating features of the present invention.
FIG. 6B is a further sectional schematic view of the embodiment of FIG. 6A.

FIGS. 6A and 6B show an alternate embodiment of a method of applying a three-dimensional applique effect utilizing the applique configuration 200 set forth with regard to FIG. 3. FIG. 4A shows an applique configuration 450, similar to the applique configuration 200 of FIG. 3, in that it comprises an applique 152, an article of clothing 154, a structure-imparting material 156 and a support backing 158, wherein like reference numbers have been utilized to denote like features. Like in methods previously discussed herein, indentations can be formed by applying force 452 to the applique configuration 450. Unlike in the embodiments set forth above, an additional force 454 is applied the opposite side 456 of the applique configuration 450, imparting shape and forming one or more indentations. This additional force can be utilized in addition to the previous described indentation-forming forces or in lieu of them.

The resulting applique configuration 500 of the application of force to the applique configuration 450 of FIG. 6A is shown in more detail in FIG. 6B, which shows the resulting applique configuration 500 comprising the applique 152, article of clothing 154, structure-imparting material 156 and support backing 158 of the original applique configuration 450, albeit now in a modified configuration 500. The applique configuration 500 in FIG. 6B shows that the application of force mentioned herein with regard to FIG. 6A causes one or more areas of indentation 502, 504, forming one or more protrusions 506 corresponding to the desired shape of the applique 152 defined by the application of the force.

FIG. 6B also shows the alteration to the shape 508 of the protrusion 506 caused by the application of the additional force 454 that is shown in FIG. 6A. Since this alteration of shape 508 alters the shape of the support backing 158, the structure-imparting material 156 can be further confined though the use of one or more closing structures 510 (one shown), which can close or otherwise secure the gap formed by the alteration in shape 508 of the protrusion 506. Any of the structures listed herein with regard to the securing structures discussed above can also be utilized as closing structures 510.

Figures 7A, 7B:
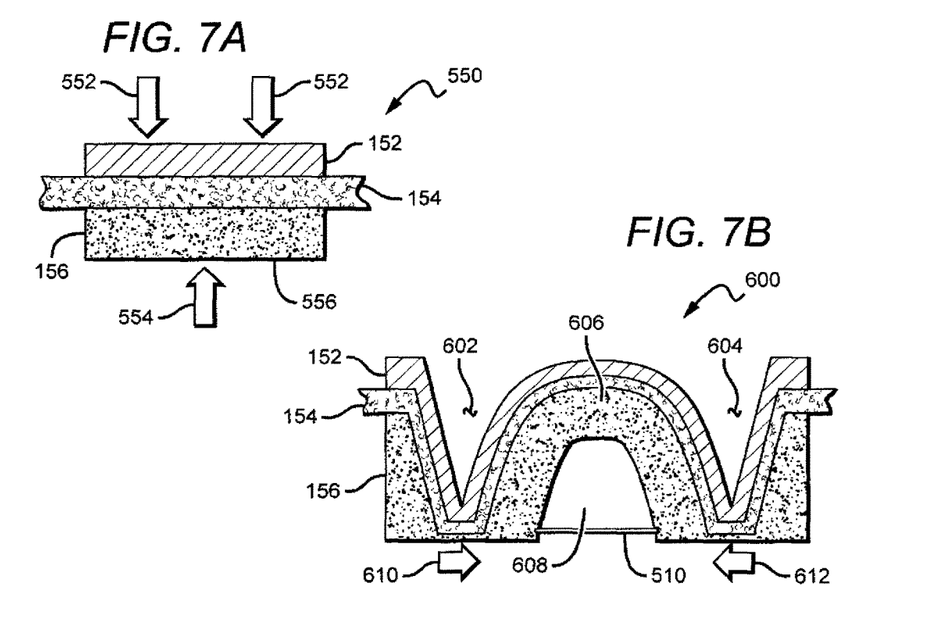
FIG. 7A is a sectional schematic view of a fourth embodiment of a method of applying a three-dimensional applique incorporating features of the present invention.
FIG. 7B is a further sectional schematic view of the embodiment of FIG. 7A.

An additional embodiment utilizing such closing structures is set forth in FIGS. 7A and 7B. FIGS. 7A and 7B show an alternate embodiment of a method of applying a three-dimensional applique effect utilizing the applique configuration 200 set forth with regard to FIG. 3. FIG. 7A shows an applique configuration 550, similar to the applique configuration 200 of FIG. 3, in that it comprises an applique 152, an article of clothing 154 and a structure-imparting material 156, wherein like reference numbers have been utilized to denote like features. Unlike the applique configuration 200 in FIG. 3, the applique configuration 550 does not comprise a support backing. Like in methods previously discussed herein, indentations can be formed by applying force 552 to the applique configuration 550 and like in the embodiments set forth in FIGS. 6A and 6B an additional force 554 can be applied the opposite side 556 of the applique configuration 550, imparting shape and forming one or more indentations.

The resulting applique configuration 600 of the application of force to the applique configuration 550 of FIG. 7A is shown in more detail in FIG. 7B, which shows the resulting applique configuration 600 comprising the applique 152, article of clothing 154 and the structure-imparting material 156 of the original applique configuration 550, albeit now in a modified configuration 600. The applique configuration 600 in FIG. 7B shows that the application of force mentioned herein with regard to FIG. 7A causes one or more areas of indentation 602, 604, forming one or more protrusions 606 corresponding to the desired shape of the applique 152 defined by the application of the force. FIG. 7B also shows the alteration to the shape of and formation of a gap 608 in the protrusion 606 caused by the application of the additional force 554 that is shown in FIG. 7A.

Due to the lack of a support backing, it can be advantageous to utilize one or more closing structures 510, like those described in reference to FIG. 6B, to provide more stability and support to the applique configuration 600 and to further confine the structure-imparting material 156. In the embodiments shown, the gap 608 can be effectively closed and the structure-imparting material 156 more fully confined by applying one or more lateral forces 610, 612 such that the gap is closed before securing the protrusion 606 in place utilizing closing structure 510. This helps to further confine the structure-imparting material 156 and thus enhance the three-dimensional effect, especially in embodiments without a support backing where such further confinement is desired.

Figure 8A:
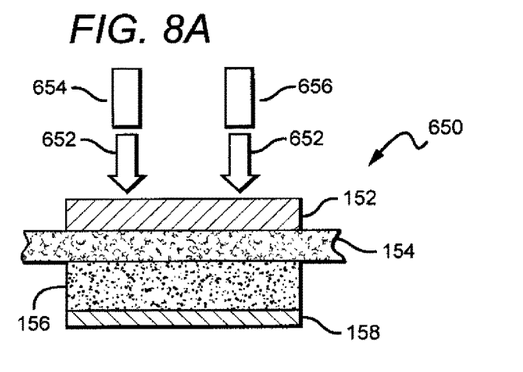
FIG. 8A is a sectional schematic view of a fifth embodiment of a method of applying a three-dimensional applique incorporating features of the present invention.
Figure 8B:
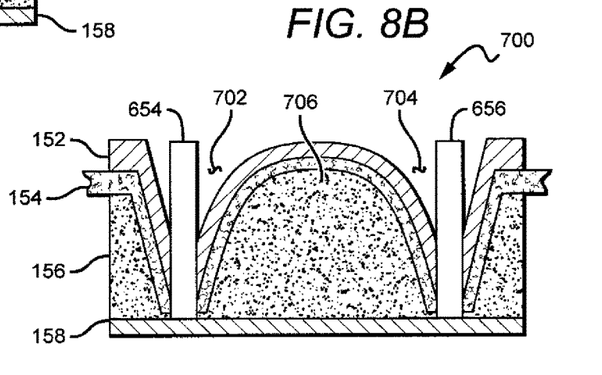
FIG. 8B is a further sectional schematic view of the embodiment of FIG. 8A.

Additional methods incorporating features of the present invention are shown in FIG. 8A and FIG. 8B. FIGS. 8A and 8B show an embodiment of a method of applying a three-dimensional applique effect utilizing the applique configuration 200 set forth with regard to FIG. 3. FIG. 8A shows an applique configuration 650, similar to the applique configuration 200 of FIG. 3, in that it comprises an applique 152, an article of clothing 154, a structure-imparting material 156 and a support backing 158, wherein like reference numbers have been utilized to denote like features. FIG. 8A also shows that the force 652 can be applied by the introduction of one or more shape-defining structures 654, 656 (two shown).

The shape defining structures 654, 656 can comprise any material suitable for the purpose of defining a boundary between various shapes, for example, between multiple instances of indentations and/or multiple instances of protrusions. Some example materials can include but are not limited to: resin, rubber, vinyl, polyurethane, poly vinyl chloride (PVC), polystyrene foam, polymers/copolymer substances, acrylic substances, plastic, leather, metal, glass, fiberglass, wood, cloth or a combination thereof. In some embodiments, the shape-defining structures 654, 656 are additional embroidery materials, such as thread that is stitched to a desired height to define additional borders and shapes to enhance and/or further define a three-dimensional structure.

The resulting applique configuration 700 of the application of the shape-defining structures 654, 656 to the applique configuration 250 of FIG. 8A is shown in more detail in FIG. 8B, which shows the resulting applique configuration 700 comprising the applique 152, article of clothing 154, structure-imparting material 156 and support backing 158 of the original applique configuration 650, albeit now in a modified configuration 700. The applique configuration 700 in FIG. 8B shows that the application of the shape-defining structures 654, 656 herein with regard to FIG. 8A causes one or more areas of indentation 702, 704, forming one or more protrusions 706 corresponding to the desired shape of the applique 152 defined by the application of the shape-defining structures 654, 656. The shape-defining structures 654, 656 can be of varying heights to compliment or contrast with the indentions 702, 704 and the protrusions 706. The shape-defining structures 654, 656 can thus further outline and/or otherwise define portions of the three-dimensional applique effect.

Figure 9A:
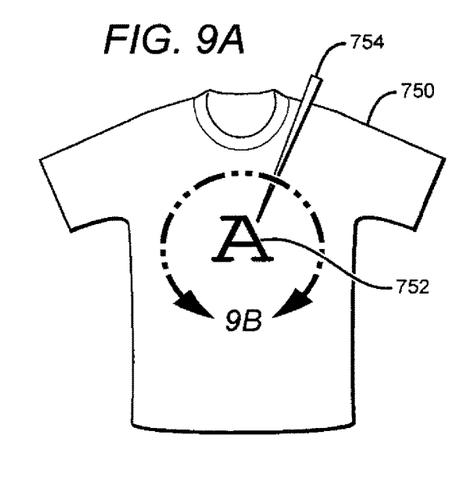
FIG. 9A is a top schematic view of a sixth embodiment of a method of applying a three-dimensional applique incorporating features of the present invention.
Figure 9B:
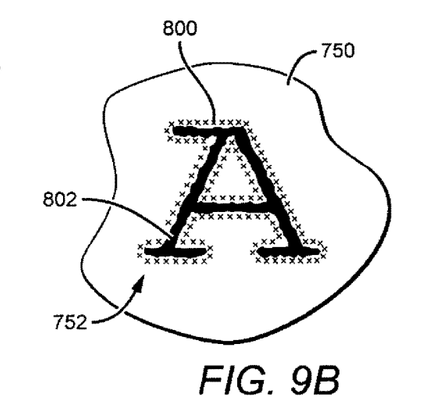
FIG. 9B is an enlarged view of the applique portion of the embodiment of FIG. 9A.

FIGS. 9A and 9B show an additional view of methods incorporating features of the present invention. FIG. 9A shows an example of an article of clothing 750 (shown as an example t-shirt) to which a three-dimensional applique 752 has been attached, like before, the example three-dimensional applique is a stylized letter "A." In the embodiments shown, embroidery is the method used to provide the force and any resulting securing elements, with an embroidery device 754 shown. The embroidery device 754 can be any known embroidery device, for example, a manual sewing needle or a sewing machine. With reference to the sectional views described herein, the letter "A" is equivalent to the applique, the t-shirt equivalent to the article of clothing. The structure-imparting material and the support backing are not shown in this view, as they are located on the opposite side of the front of the t-shirt 750 (i.e. the inner portion of the front side of the T-shirt) as the applique 752, thus sandwiching the t-shirt between the structure-imparting material and the support backing on one side and the applique on the other side.

FIG. 9B shows an enlarged view of the applique 752 and the surrounding portion of the article of clothing 750. Stitching from the embroidery device 754 creates indentations 800 around the perimeter of the letter "A" 752, which help to define the shape of the letter. In some embodiments, stitching used to create the indentations can attach the perimeter of the letter "A" 752 to the T-shirt 750 and the underlying support backing, thus sandwiching the underlying structure-imparting material and the T-shirt 750 between the support backing and the applique 752. In some embodiments, the stitching creating the indentions 800 can comprise a height such that the stitching functions as shape-defining structures as outline above. The indentations 800 cause the inner portion of the letter "A" to form a protruding portion 802 caused by the confined structure-imparting material pressing against the applique 752, which causes the shape of the letter "A" to exhibit a three-dimensional effect.

Figure 10A:
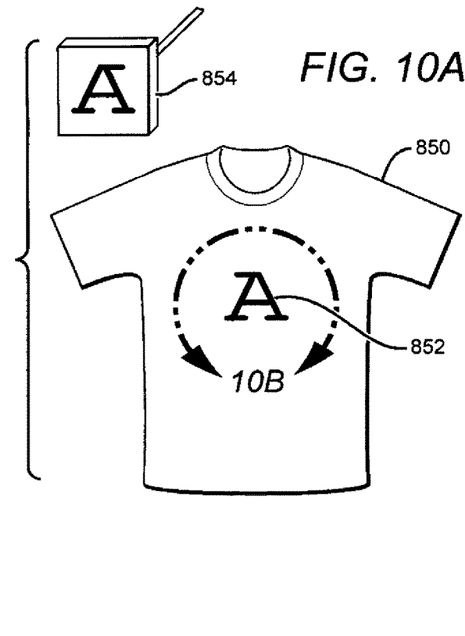
FIG. 10A is a top schematic view of a seventh embodiment of a method of applying a three-dimensional applique incorporating features of the present invention.
Figure 10B:
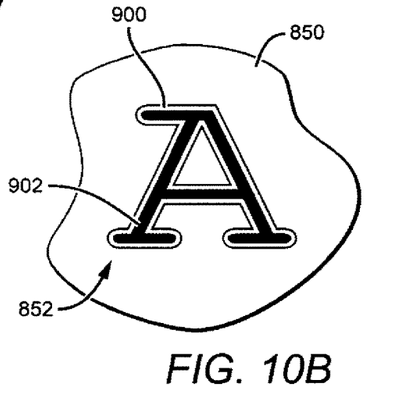
FIG. 10B is an enlarged view of the applique portion of the embodiment of FIG. 10A.

FIGS. 10A and 10B show an additional view of methods incorporating features of the present invention similar to those shown in FIGS. 9A and 9B respectively. FIG. 10A shows an example of an article of clothing 850 (shown as an example t-shirt) to which a three-dimensional applique 852 has been attached, like before, the example three-dimensional applique is a stylized letter "A." Instead of embroidery, a press device 854 is used as the method used to provide the force and any resulting securing elements. The press device 854 can be any press device known in the art, for example, any embossing, stamping and or heat/temperature press device. Like in FIGS. 9A and 9B above, the structure-imparting material and the support backing are not shown in this view, as they are located on the opposite side of the front of the t-shirt 850 as the applique 852, thus sandwiching the t-shirt between the structure-imparting material and the support backing on one side and the applique on the other side.

FIG. 10B shows an enlarged view of the applique 852 and the surrounding portion of the article of clothing 850. As shown, the press device 854 presses indentations 900 around the perimeter of the letter "A," outlining it and defining the shape of the applique 852. This causes the formation of protruding portions 902 which cause the inner portions of the letter "A" to protrude and produce a three-dimensional effect as in FIG. 9B above.

Figure 11A:
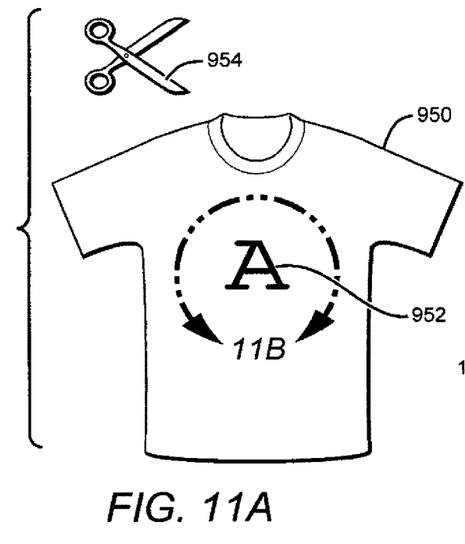
FIG. 11A is a top schematic view of a seventh embodiment of a method of applying a three-dimensional applique incorporating features of the present invention.
Figure 11B:
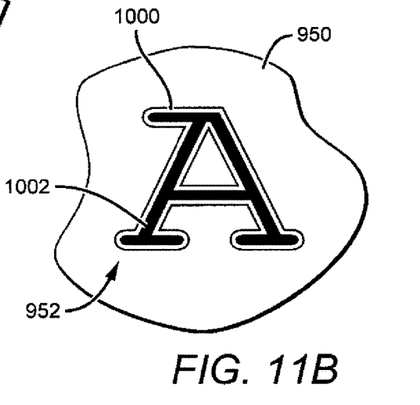
FIG. 11B is an enlarged view of the applique portion of the embodiment of FIG. 11A.

FIGS. 11A and 11B show an additional view of methods incorporating features of the present invention similar to those shown in FIGS. 10A and 10B respectively. FIG. 11A shows an example of an article of clothing 950 (shown as an example t-shirt) to which a three-dimensional effect 952 is applied, like before, the example three-dimensional effect is a stylized letter "A." In FIGS. 11A and 11B, a cutting device 954 is used as the method used to provide the force. The cutting device can remove portions of the article of clothing 950 to form the desired three-dimensional effect 952. Any sufficient cutting device can be used including scissors, laser cutting devices, mechanical cutting devices, chemical-based cutting devices, any cutting device known in the art, any device that is configured such that it can remove portions of the article of clothing 950 or an applique and/or combinations thereof. Like in FIGS. 10A and 10B above, the structure-imparting material and the support backing are not shown in this view, as they are located on the opposite side of the front of the t-shirt 950 as the three-dimensional effect 952, thus sandwiching the t-shirt between the structure-imparting material and the support backing on one side and the three-dimensional on the other side.

FIG. 11B shows an enlarged view of the three dimensional effect 952 and the surrounding portion of the article of clothing 950. As shown, the cutting device 954 removes portions 1000, forming the letter "A" by outlining and defining the shape of the three-dimensional effect 952. This causes the formation of protruding portions 1002 which cause the inner portions of the letter "A" to protrude in comparison to the removed portions 1000 and produce a three-dimensional effect as in FIG. 10B above. In some embodiments, the removed portions 1000 are removed completely, exposing the support backing. In some embodiments only small portions of the article of clothing are removed so that the removed portions 1000 are not removed all the way to a depth corresponding to the support backing. In some embodiments, multiple layers of clothing or an applique-on-clothing or clothing-on-applique configuration are utilized so a layer of clothing can be removed exposing an underlying layer that is on the support backing but under the clothing.

Figure 12:
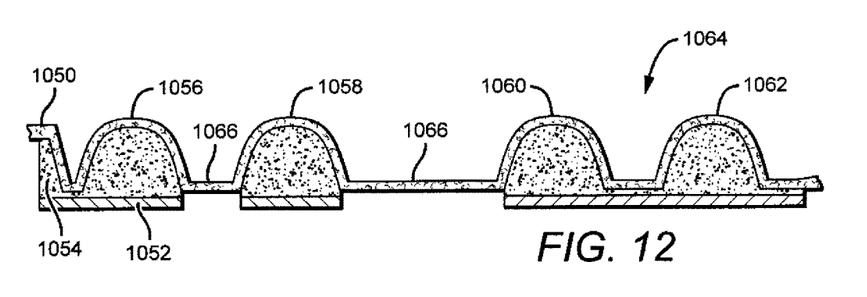
FIG. 12 is sectional schematic view of some example applications of three-dimensional effects incorporating features of the present invention.

It is understood that in any of the disclosed embodiments, one or more three-dimensional effects or separate three-dimensional applique portions can be separate, connected, applied, arranged, configured and/or positioned in a variety of ways and positions on an article of clothing or other object to receive the three-dimensional effect or applique. FIG. 12 shows some example configuration of three dimensional effects incorporating features of the present invention.

FIG. 12 shows an article of clothing 1050 and a support backing 1052 with a structure-imparting material 1054 sandwiched in between the two. First through fourth protrusions 1056, 1058, 1060 1062 are formed as discussed above. FIG. 12 shows several example arrangements wherein the various protrusions 1056, 1058, 1060 and 1062 can be linked or separated. For example, the first protrusion 1056 is adjacent to the second protrusion 1058. Different protrusions can be divided by their indentations to separate different shapes of a closely-linked larger shape, for example, different letters in a word.

As seen in FIG. 12, there can be at least one portion 1066 (two shown) of the article of clothing 1050 where no three-dimension effects have been applied. This portion can be free from support backing 1052 and structure-imparting material 1054. This portion 1066 can correspond to simply the majority of the article of clothing 1050 which is devoid of three-dimensional effects and/or be used to separate one or more protrusions from other protrusions, for example, separating the first and second protrusions 1056, 1058 from the third and fourth protrusions 1060, 1062 as shown. The third and fourth protractions 1060, 1062 are continuously linked as shown. These protrusions 1060, 1062 share a continuous support backing 1052 and structure-imparting material 1054 along the same section 1064 of the article of clothing 1050.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention.

I claim:

1. A method of creating a three-dimensional effect on an article of clothing, comprising the steps of:
    providing an article of clothing, at least a portion of said article of clothing designated as an area to receive said three-dimensional effect, said at least a portion of said article of clothing comprising a first side and a second side opposite said first side;
    placing an applique on said first side of said at least a portion of said article of clothing;
    placing a structure-imparting material and a support backing on said second side of said at least a portion of said article of clothing, such that said at least a portion of said article of clothing is sandwiched between said applique and said structure-imparting material and said structure-imparting material is sandwiched between said at least a portion of said article of clothing and said support backing, such that said article of clothing extends beyond a perimeter of said applique and a perimeter of said structure-imparting material; and
    applying securing structures through said at least a portion of said article of clothing, said applique, said structure-imparting material, and said support backing, such that said at least a portion of said article of clothing and said structure-imparting material cooperate to form at least one permanent protrusion.

2. The method of claim 1, wherein said structure-imparting material comprises a flexible foam-like structure.

3. The method of claim 1, wherein said structure-imparting material comprises a polyester-based material.

4. The method of claim 1, wherein said structure-imparting material comprises a multilayered flexible foam and fabric structure.

5. The method of claim 1, wherein applying said securing structures comprises utilizing embroidery techniques.

6. The method of claim 1, wherein said article of clothing extends beyond a perimeter of said support backing.

7. A method of creating a three-dimensional effect on an article of clothing, comprising the steps of:

providing an article of clothing comprising at least a portion comprising a first side and a second side opposite said first side;

placing an applique on at least a portion of said first side;

placing a structure-imparting material and a support backing on said second side, such that said at least a portion of said article of clothing is sandwiched between said applique and said structure-imparting material and said structure-imparting material is sandwiched between said at least a portion of said article of clothing and said support backing, such that said article of clothing extends beyond a perimeter of said applique, a perimeter of said structure-imparting material, and a perimeter of said support backing; and applying one or more securing structures through said applique, said article of clothing, said structure-imparting material, and said support backing, to form one or more indentations, said indentations defining one or more three-dimensional protrusions.

8. The method of claim 7, wherein said one or more securing structures comprises stitching.

9. A method of creating a three-dimensional effect on an article of clothing, comprising the steps of:

providing an article of clothing;

placing an applique on at least a portion of a first side of said article of clothing;

placing a structure-imparting material and a support backing on a second side of said at least a portion of said article of clothing opposite said applique such that said at least a portion of said article of clothing is sandwiched between said applique and said structure-imparting material and said structure-imparting material is sandwiched between said at least a portion of said article of clothing and said support backing, such that said article of clothing extends beyond a perimeter of said applique and a perimeter of said structure-imparting material; and confining said structure-imparting material between said support backing and said applique by applying securing structures through said article of clothing, said applique, said structure-imparting material, and said support backing.

10. The method of claim 9, wherein said article of clothing extends beyond a perimeter of said support backing.

\* \* \* \* \*